United States Patent [19]

Kouno et al.

[11] Patent Number: 5,506,346
[45] Date of Patent: Apr. 9, 1996

[54] ORGANIC PHOTOCONDUCTIVE MATERIAL AND A PHOTOSENSITIVE MATERIAL FOR ELECTRONIC PHOTOGRAPHY USING IT

[75] Inventors: Hisao Kouno, Funabashi; Shyouichi Takahashi; Kazuhiro Higashide, both of Kawaguchi; Nakaji Komiyama, Urawa; Osamu Suda, Ohmiya; Masaru Hasegawa, Tokyo, all of Japan

[73] Assignee: Dainichiseika Color & Chemicals Mfg. Co., Ltd., Tokyo, Japan

[21] Appl. No.: 202,355

[22] Filed: Feb. 28, 1994

[30] Foreign Application Priority Data

Jun. 7, 1993 [JP] Japan .................. 5-163206

[51] Int. Cl.$^6$ .................. G03G 5/06; C07C 245/02
[52] U.S. Cl. .................. 534/653; 534/654; 534/689; 534/691; 534/738; 534/752; 534/760; 534/761; 534/762; 534/797; 534/812; 534/819
[58] Field of Search .................. 534/653, 738, 534/760, 762, 797, 819

[56] References Cited

U.S. PATENT DOCUMENTS

| | | | |
|---|---|---|---|
| 4,631,242 | 12/1986 | Emoto et al. | 534/760 X |
| 4,912,001 | 3/1990 | Kouno et al. | 430/71 |
| 5,344,736 | 9/1994 | Komiyama et al. | 430/58 X |

FOREIGN PATENT DOCUMENTS

| | | |
|---|---|---|
| 0391371 | 10/1990 | European Pat. Off. . |
| 0451844 | 10/1991 | European Pat. Off. . |
| 0518376 | 12/1992 | European Pat. Off. . |
| 4-149448 | 5/1992 | Japan . |
| 5-289376 | 5/1993 | Japan . |

OTHER PUBLICATIONS

Doi et al., *Chemical Abstracts*, 121:121648t (1994).
Kono et al., *Chemical Abstracts*, 117:223071j (1992).
Kono et al, *Chemical Abstracts*, 121:121700d (1994).
Patent Abstract of Japan, JP 04-170471, Jun. 18, 1992.

*Primary Examiner*—Fiona T. Powers
*Attorney, Agent, or Firm*—Young & Thompson

[57] ABSTRACT

An organic photoconductive material is represented by the following general formula [1]:

$$A_1-N{=}N-B-N{=}N-A_2 \qquad [1],$$

wherein B is a divalent organic group bonded to nitrogen atoms forming azo groups, $A_1$ and $A_2$ are groups different from each other, $A_1$ is represented by the following general formula [A1]:

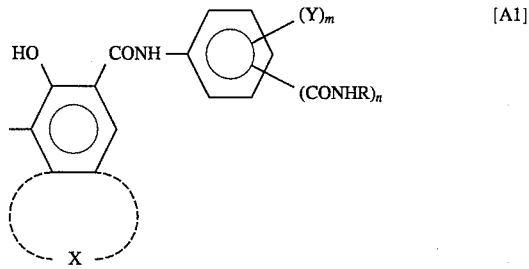

wherein X is an atomic group which is necessary for forming an aromatic hydrocarbon ring or an aromatic hetero-ring by condensation with the benzene ring, Y is a hydrogen atom, an alkyl group, an alkoxy group or a halogen atom, m is an integer of 1 to 4, R is an aromatic hydrocarbon ring group or an aromatic hetero-ring group and n is 1 or 2, and $A_2$ is a group represented by one of the following general formulae [A2] and [A3]:

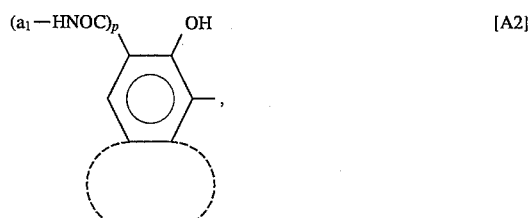

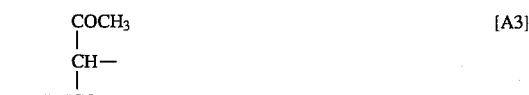

wherein $a_1$ is a group selected from R, -N=CH-R and

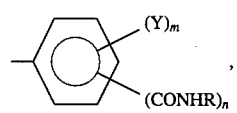

R, X, Y, m and n are the same as those in the general formula [A1] and p is 0 or 1. A photosensitive material electronic photography having excellent properties, such as charging property, retention of charge, sensitivity, residual voltage and image formation, and showing no change of the properties afar repeated use for a long time can be obtained by using an azo compound having a specific structure as the carrier generating substance. A photosensitive material for electric photography of a laminate type or a dispersion having high performance and high durability can also be provided.

6 Claims, No Drawings

ORGANIC PHOTOCONDUCTIVE MATERIAL AND A PHOTOSENSITIVE MATERIAL FOR ELECTRONIC PHOTOGRAPHY USING IT

BACKGROUND OF THE INVENTION

1. Field of the Invention

The present invention relates to a novel organic photoconductive material and a photosensitive material for electronic photography using it. More particularly, the present invention relates to an organic photoconductive material comprising a specific azo compound and a novel photosensitive material for electronic photography comprising a photosensitive layer containing it.

2. Description of the Related Art

Recently, electronic photography has been adopted not only in the field of photocopier but also widely in the fields where photographic technology has been used, such as printing form plates, slide films, microfilms and the like. Application to high speed printing using RASER, LED or CRT as the light source is also being developed. Application of electronic photosensitive materials to fields other than the photosensitive materials for electronic photography, such as electrostatic recording elements, sensor materials and the like, is also a subject of recent studies. Therefore, requirements for electronic photoconductive materials and photosensitive materials for electronic photography using them are becoming higher in degree and wider in range.

Materials comprising a photosensitive layer containing an inorganic photoconductive material, such as amorphous selenium, cadmium sulfide, zinc oxide and the like, as the main component thereof have been used mainly as the photosensitive material for electronic photography. Even though the photoconductive materials using inorganic materials are useful, they are not always satisfactory with respect of sensitivity, heat stability, moisture resistance and durability. Particularly, they have problems on handling during production because of toxicity of amorphous selenium and cadmium sulfide.

Photosensitive materials for electronic photography using various kinds of organic photoconductive materials have been proposed and adopted in practical applications as materials having no such problems. Obviously, a photosensitive material for electronic photography is required to have the function of carrier generation and the function of carrier transportation. Various kinds of organic pigments, such as phthalocyanine pigments, multi-ring quinone pigments, indigo pigments, dioxadine pigments, quinacridone pigments, azo pigments and the like, have been proposed as organic materials used as the carrier generating substance but only limited kinds of them have been practically applied. Only limited kinds of the carrier transporting substance have also been practically applied. Therefore, it is the actual situation of the present time that a photoconductive material which can sufficiently satisfy the wide requirements of electronic photographic processes, not to mention those of newer applications other than electronic photography, have not been obtained.

SUMMARY OF THE INVENTION

The present invention accordingly has an object to provide, by utilizing excellent carrier generating function of an azo compound represented by the general formula [1] shown below as a carrier generating substance in a photosensitive material for electronic photography of a laminate type or a dispersion type, an organic photoconductive material which exhibits not only excellent electronic photographic properties, such as charging property, retention of the charge, sensitivity, residual voltage and the like, but also good coating properties showing little change after repeated use and stable properties showing no change by the effect of heat, temperature and light, thus, is free from the drawbacks of the conventional materials and can be applied to photosensitive material for electronic photography as well as a sensor material, a electrostatic recording material and the like.

Extensive investigations undertaken by the present inventors to improve properties of organic photosensitive materials for electronic photography for achieving aforesaid object lead to a discovery that an azo compound represented by the general formula [1] shown below has excellent photoconductive property. The present invention has been completed on the basis of the discovery.

Thus, the organic photoconductive material is represented by the following general formula [1]:

$$A_1\text{-}N\!\!=\!\!N\text{-}B\text{-}N\!\!=\!\!N\text{-}A_2 \qquad [1],$$

wherein B is a divalent organic group bonded to nitrogen atoms forming azo groups, $A_1$ and $A_2$ are groups different from each other, $A_1$ is represented by the following general formula [A1]:

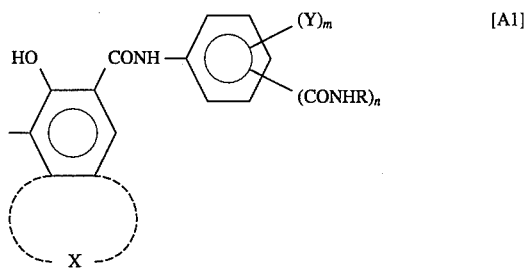

wherein X is an atomic group which is necessary for forming a substituted or unsubstituted aromatic hydrocarbon ring or a substituted or unsubstituted aromatic hetero-ring by condensation with the benzene ring, Y is an atom or a group selected from the group consisting of a hydrogen atom, an alkyl group, an alkoxy group and a halogen atom, m is an integer of 1 to 4, R is a substituted or unsubstituted aromatic hydrocarbon ring group or a substituted or unsubstituted aromatic hetero-ring group and n is 1 or 2, and $A_2$ is a group represented by one of the following general formulae [A2] and [A3]:

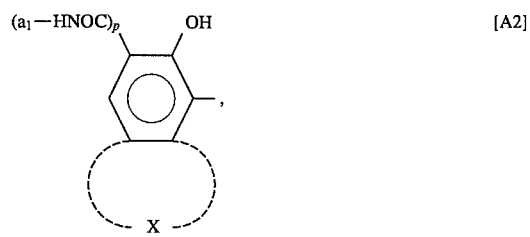

wherein $a_1$ a group selected from R, -N=CH-R and

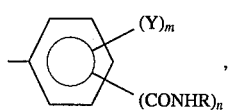

R, X, Y, m and n are the same as those in the general formula [A1] and p is 0 or 1.

Other and further objects, features and advantages of the invention will appear more fully from the following description.

DETAILED DESCRIPTION OF THE INVENTION

Examples of $A_2$ in the general formula [1] shown above are the following groups: groups represented by the following general formula A2]:

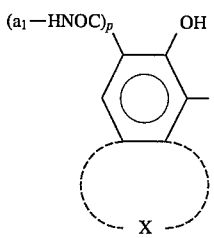   [A2]

wherein $a_1$ is a group selected from R, -N=CH-R and

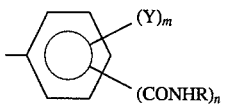

and R, X, Y, m and n are as defined above; groups represented by the following general formula [A4]:

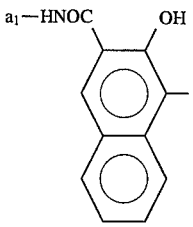   [A4]

wherein $a_1$ is as defined above; and the like groups.

Examples of B in the general formula [1] shown above are the following groups: groups represented by the following general formula B1]:

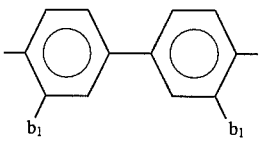   [B1]

wherein $b_1$ is H, Cl, Br, F, $CH_3$ group or $OCH_3$ group;

groups represented by the following general formula [B2]:

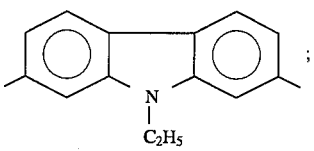   [B2]

wherein $b_2$ is -CH=CH-, -NH-, -N=N- or

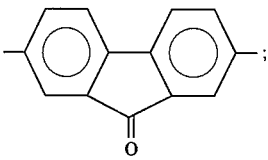;

a group having the following formula [B3]:

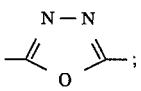   [B3]

a group having the following formula [B4]:

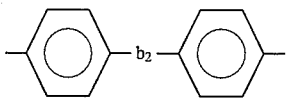   [B4]

and the like groups. An examples of X in the general formula [A1] shown above is a condensed benzene ring, such as that shown in the following general formula [X1]:

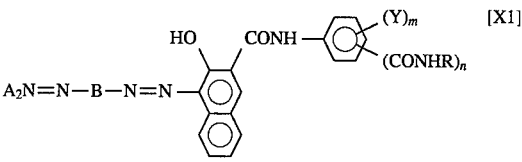   [X1]

wherein $A_2$, B, Y, R, m and n are as defined above.

Examples of R in the general formula [A1] shown above are groups represented by the following general formula [R1]:

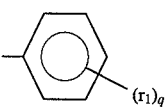   [R1]

wherein $r_1$ is -$CH_3$, -$C_2H_5$, F, Cl, Br, I, -$OCH_3$, -$NO_2$, -$N(CH_3)_2$ or -$CF_3$ and q is 0, 1 or 2; and the like groups.

Particular examples of the organic photoconductive material of the present invention represented by the general formula [X1] are: materials represented by the following general formula [X2]:

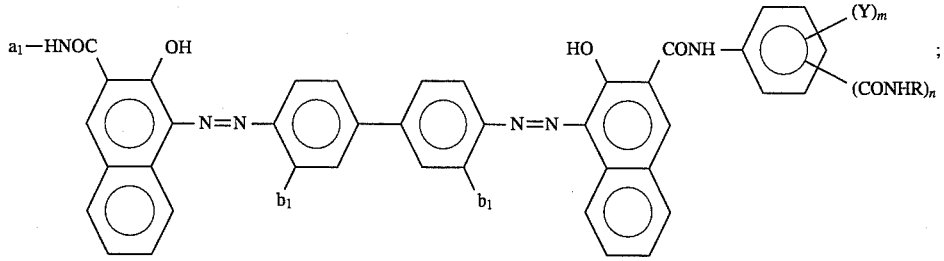

materials represented by the following general formula [X3]:

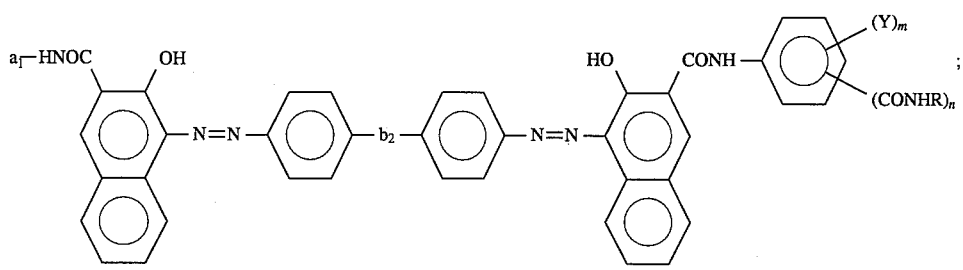

and the like other materials.

More particular examples of the photoconductive material represented by the general formula [1] of the present invention are compounds having the following structures. However, the examples are not to be construed to limit the kind of the photoconductive material of the invention.

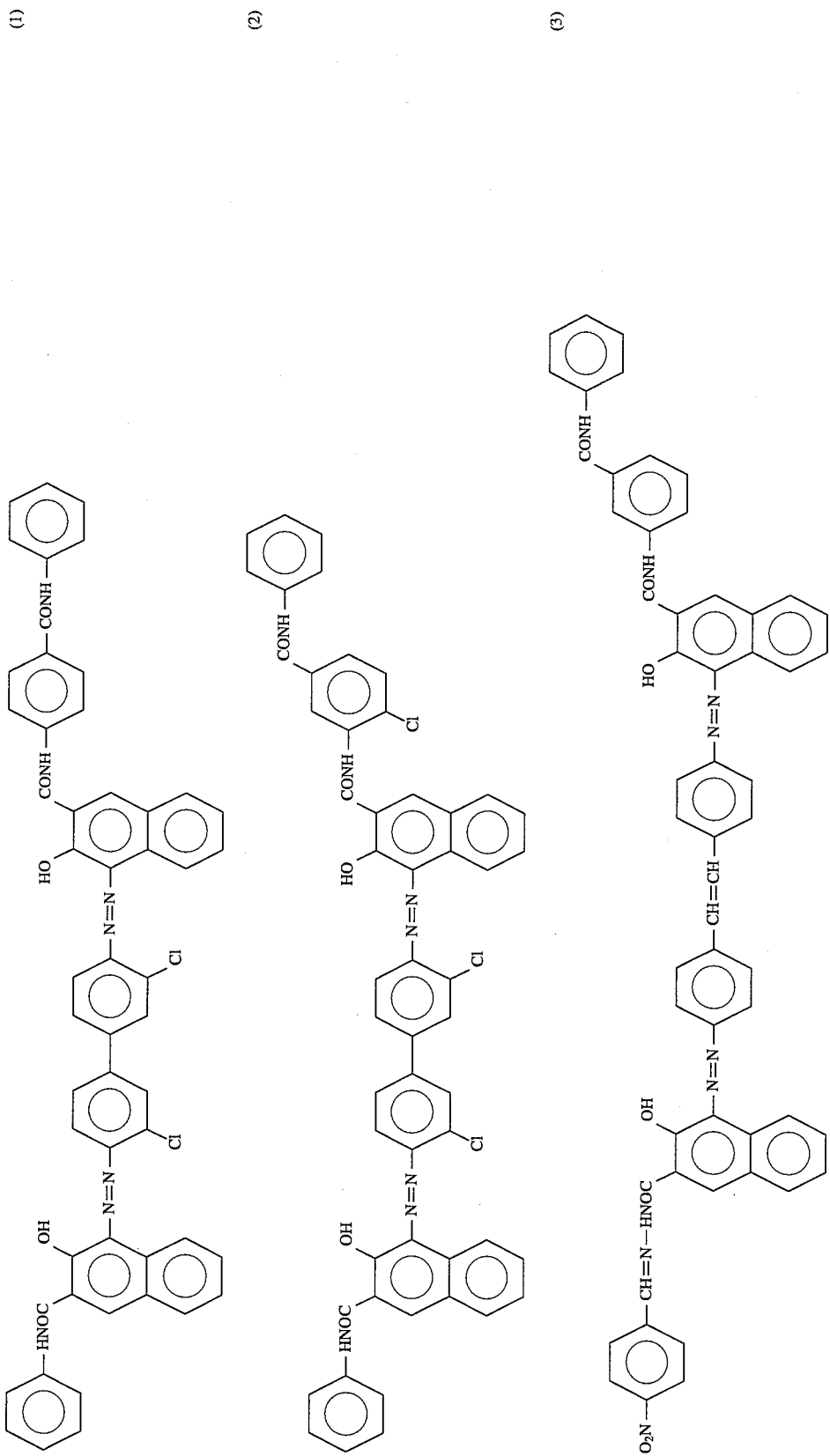

(4)
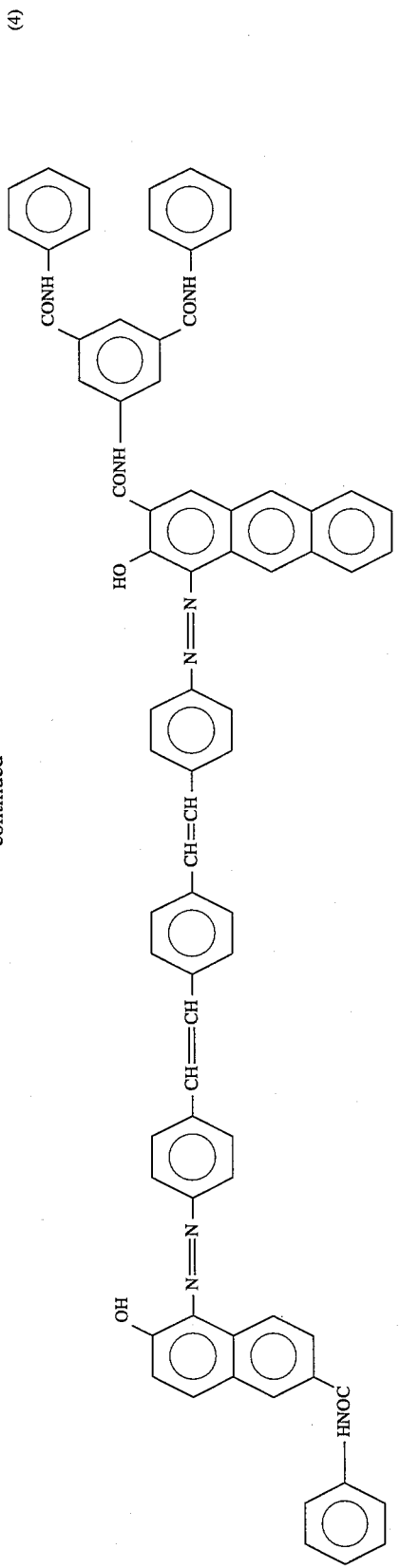
(5)
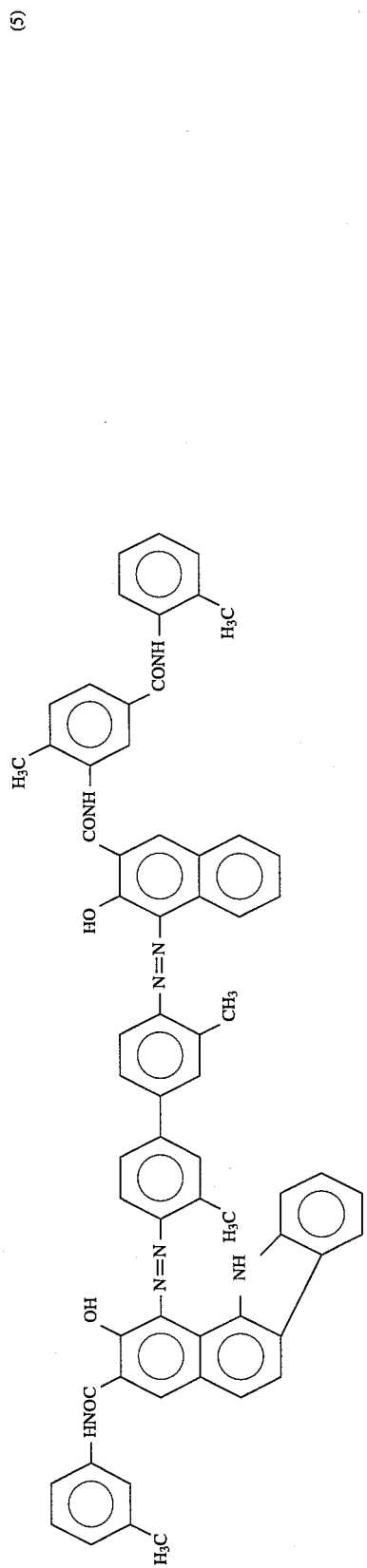
(6)
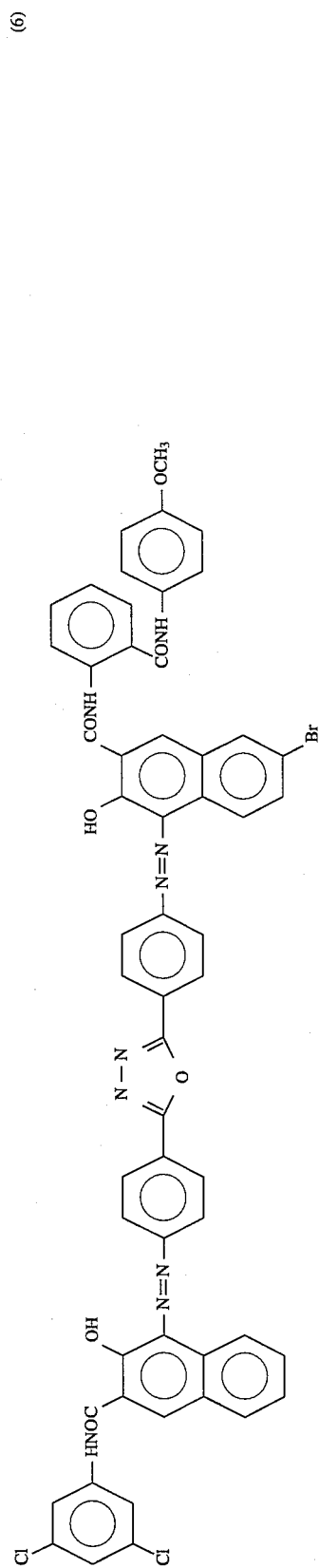

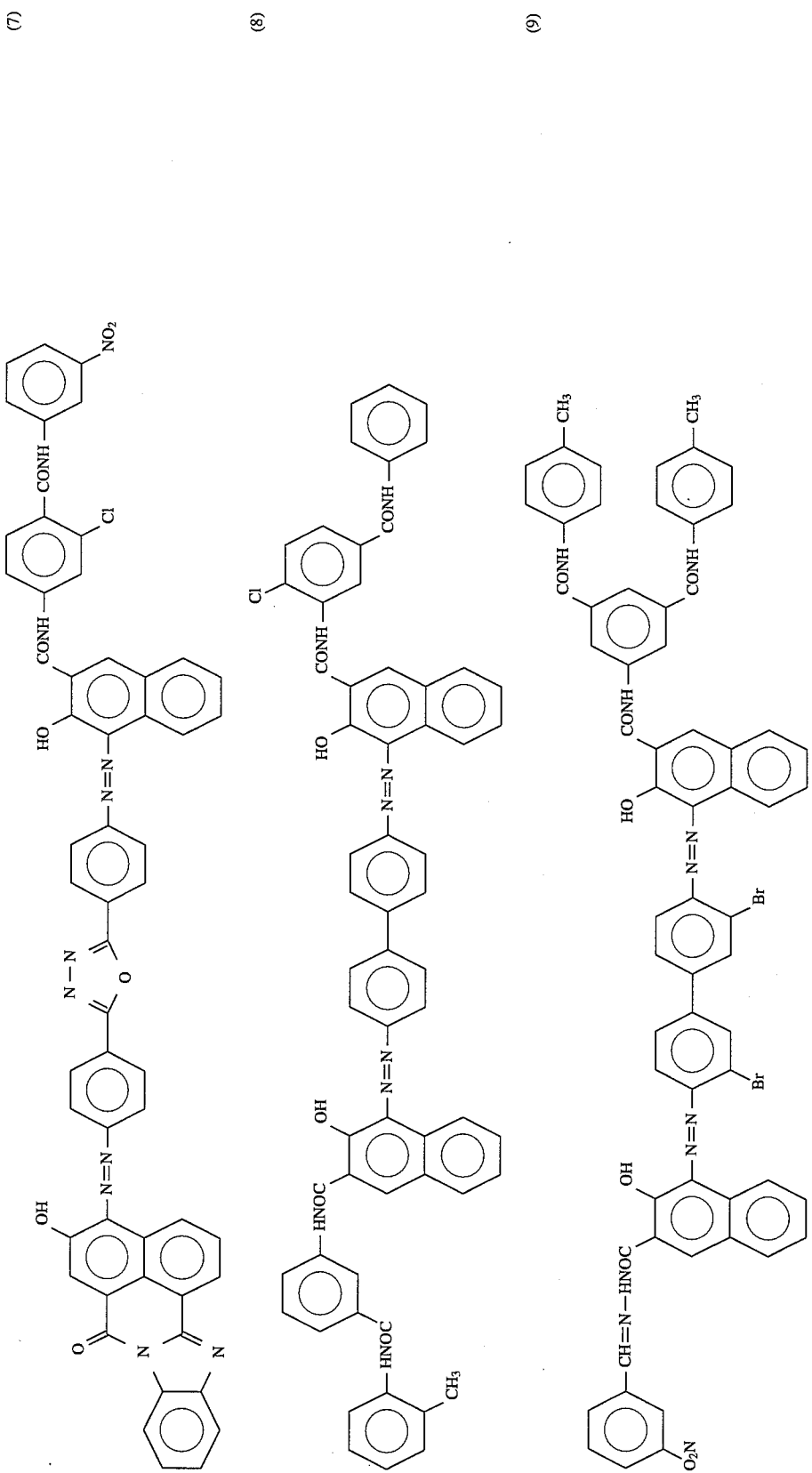

-continued
(10)
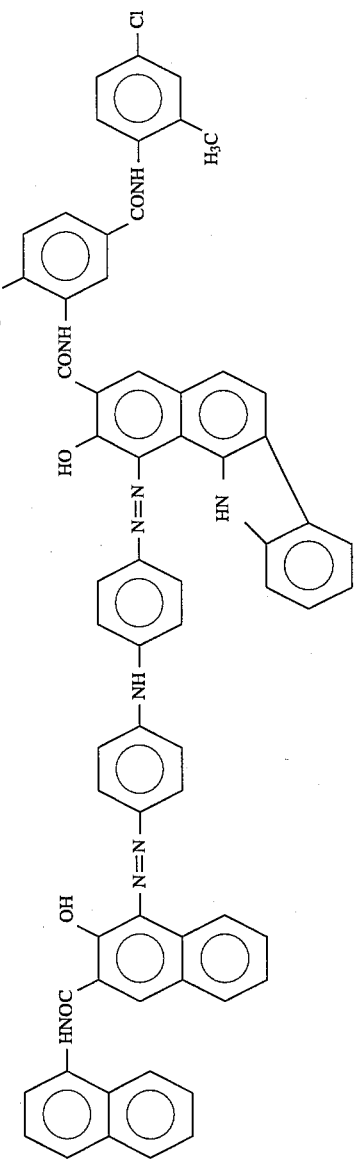
(11)
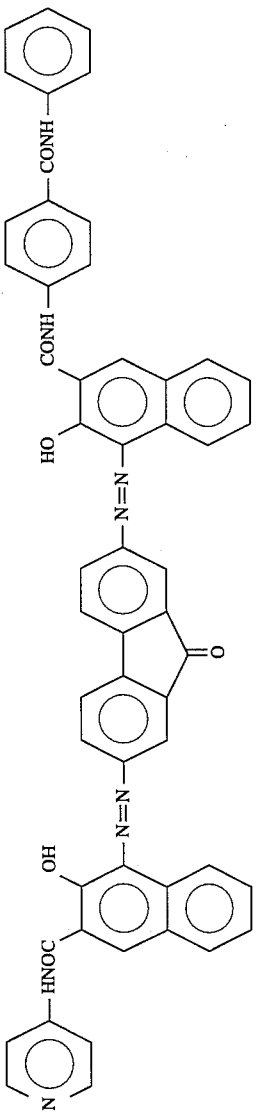
(12)
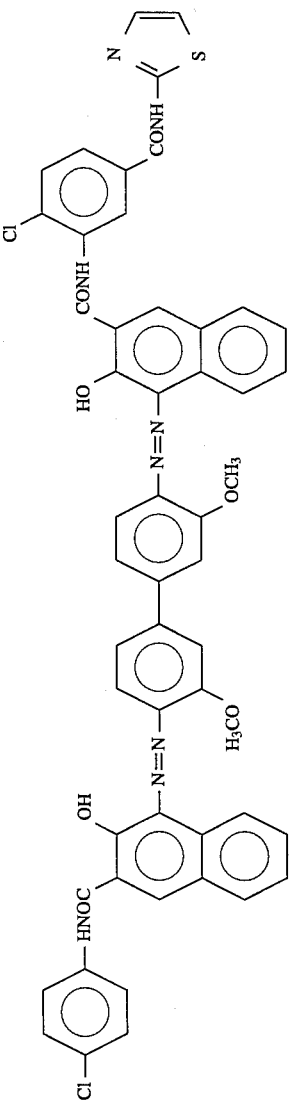

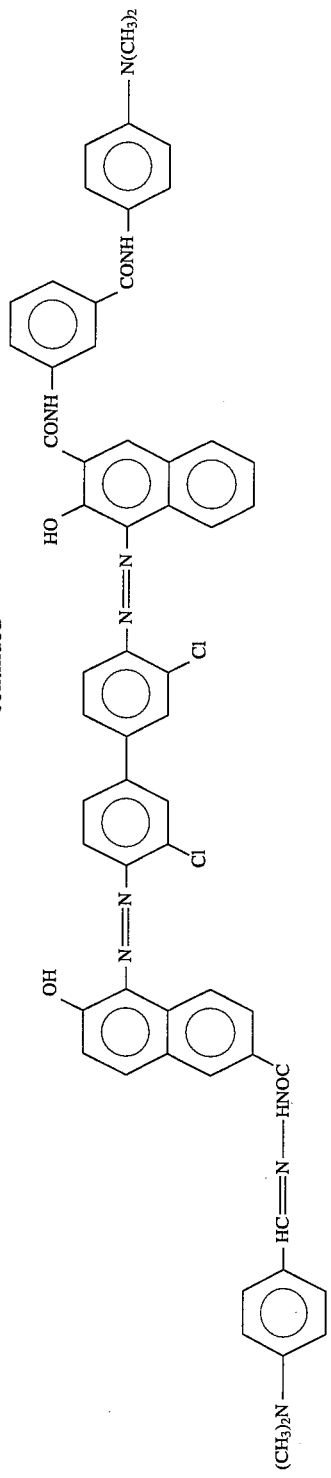
(13)
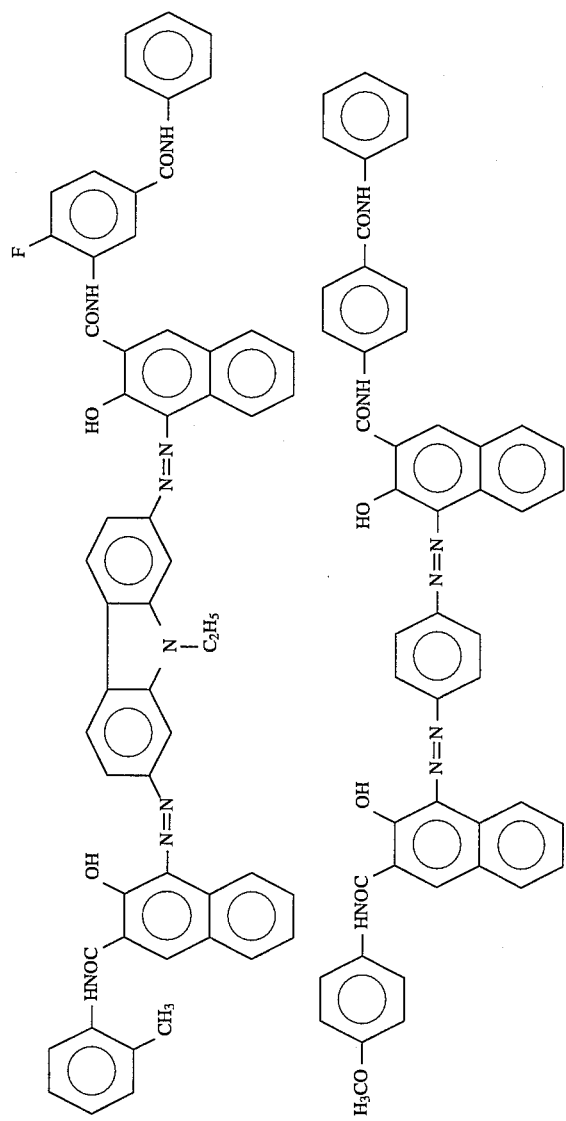
(14)
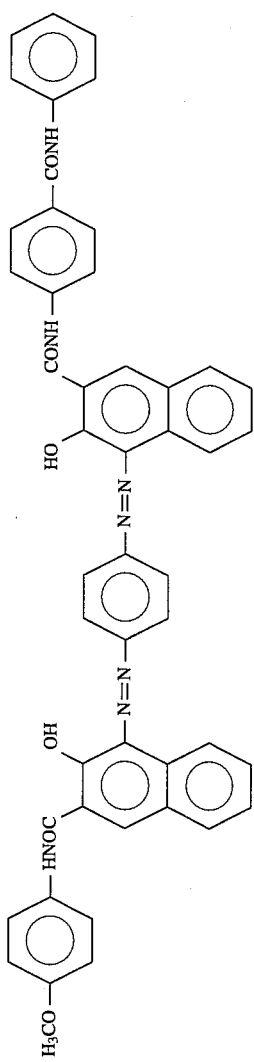
(15)

-continued
(16) 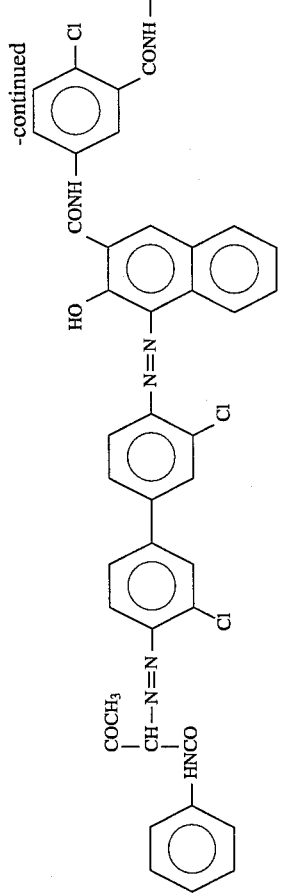
(17) 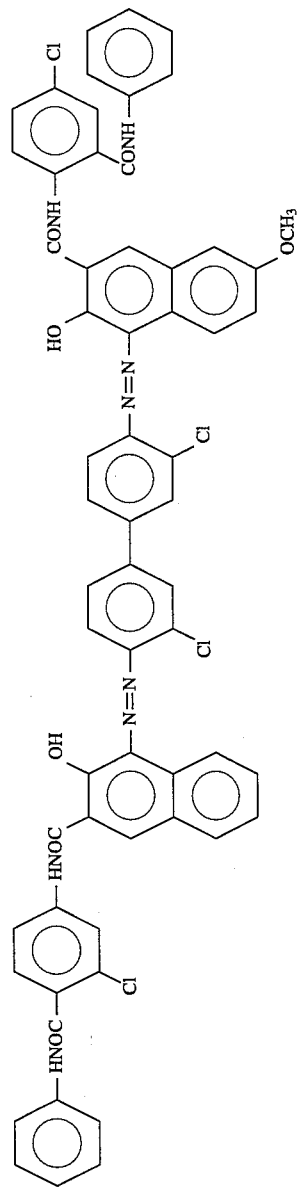
(18) 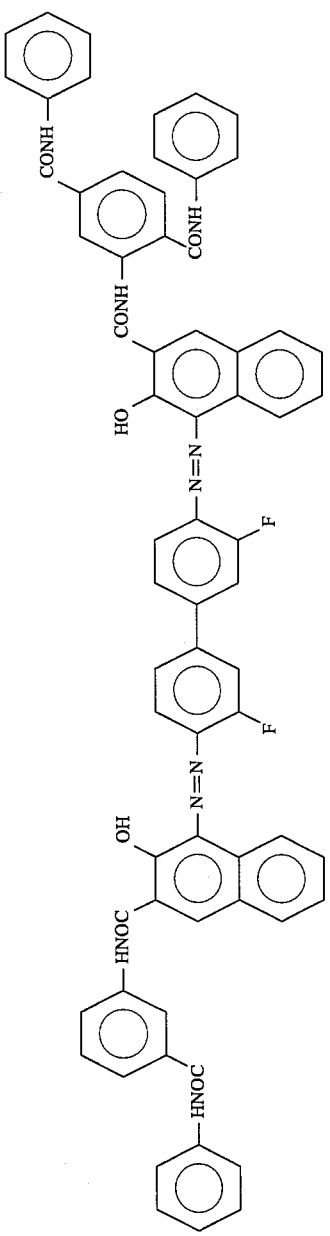

-continued
(19)
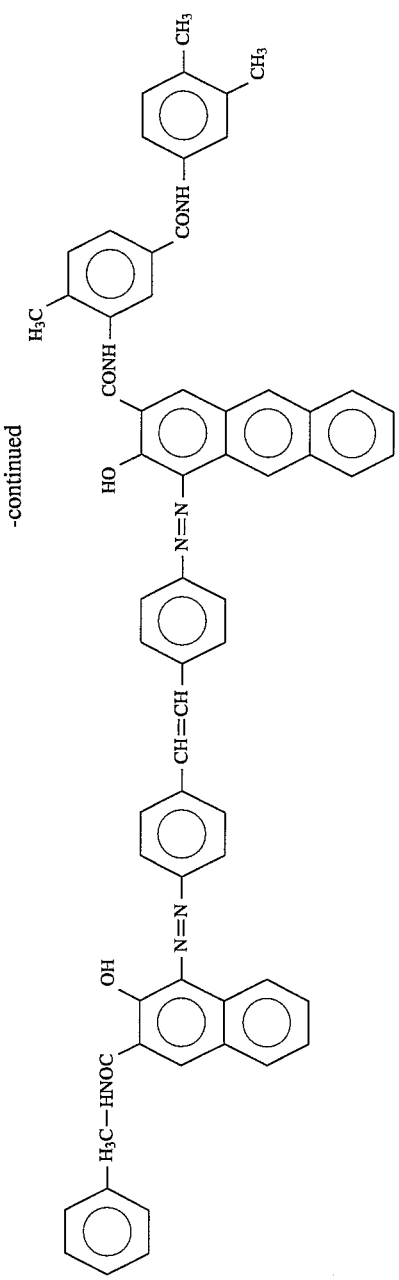
(20)
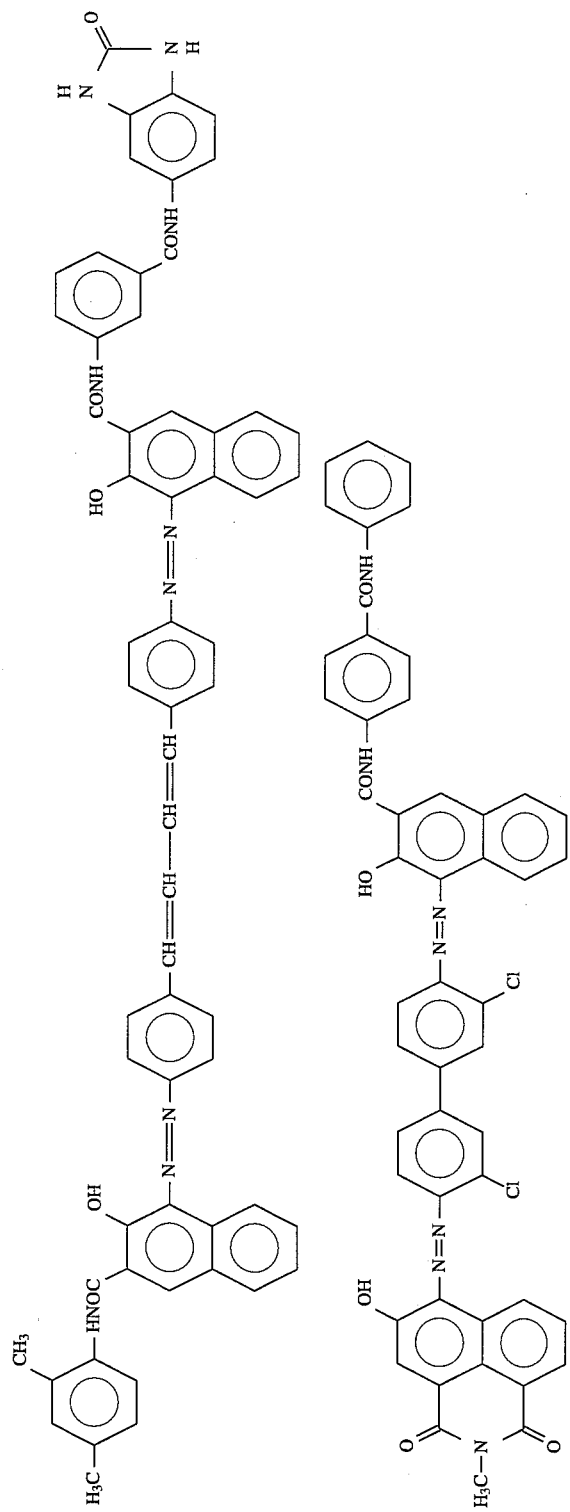
(21)

(22)
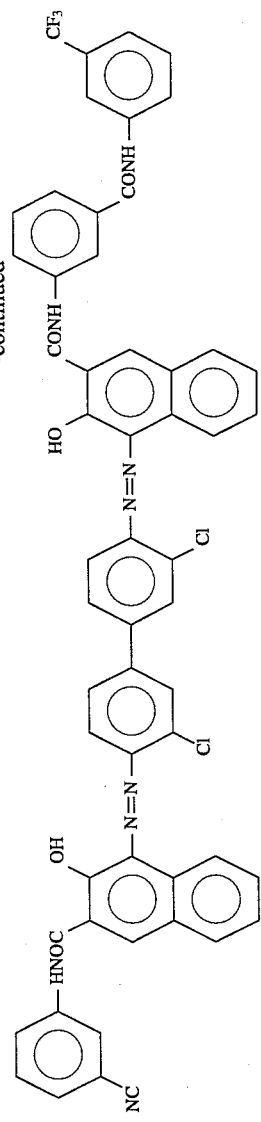
(23)
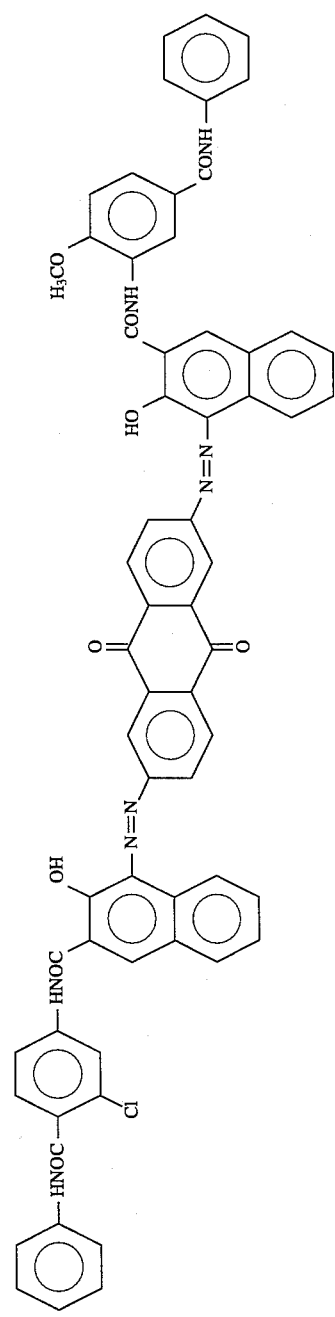
(24)
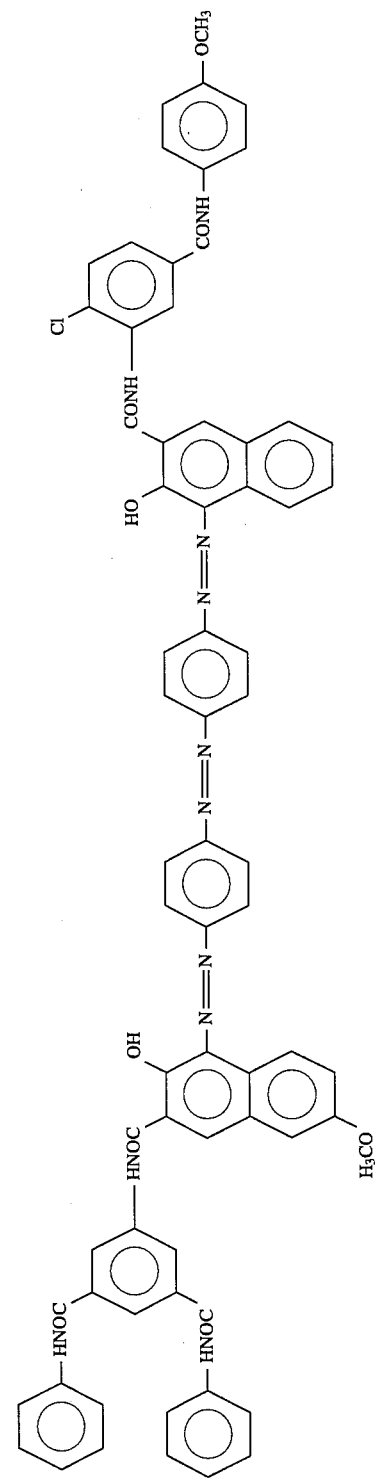

-continued
(25)
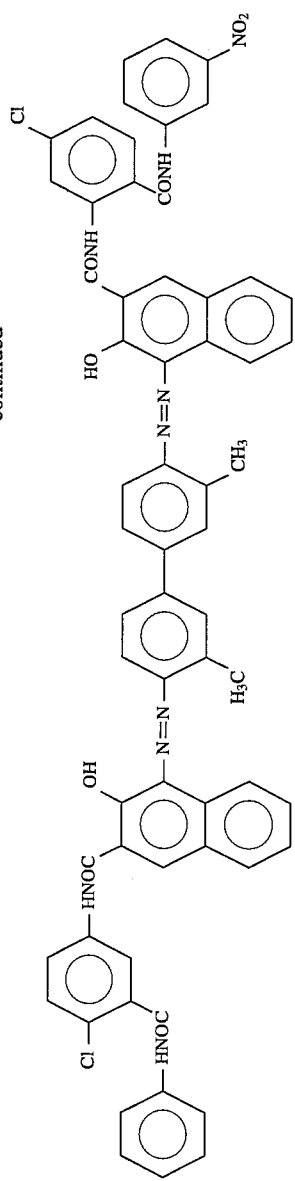
(26)
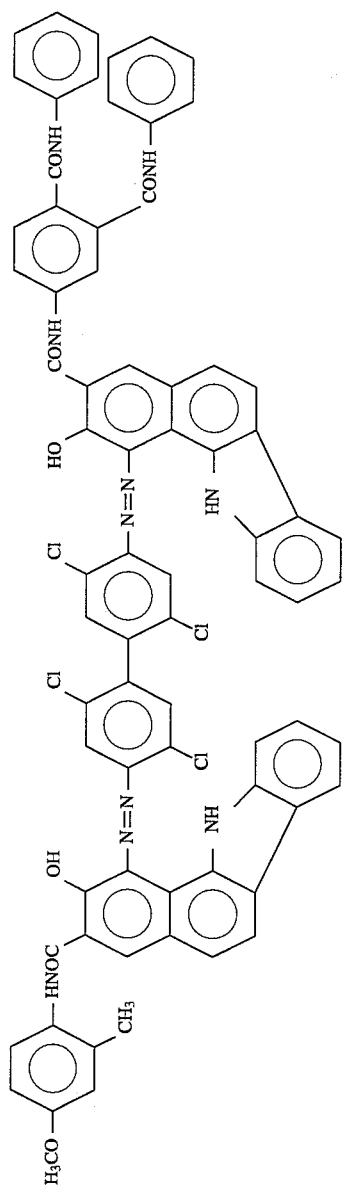

The azo compounds described above can be synthesized according to conventional methods.

A monoacyl compound of a diamine represented by the general formula $H_2N$-B-$NH_2$ (B is as defined in the general formula [1] shown above) is converted into the corresponding diazo salt by a conventional method. The diazo salt obtained is brought into coupling with the first coupling component represented by the following general formula [2]:

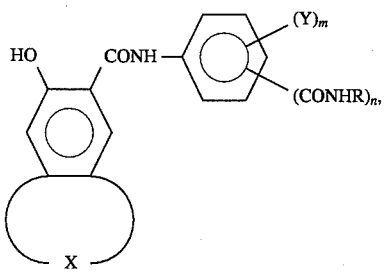

wherein X, Y, R, m and n are as defined in the general formula [1] shown above, to obtain a monoazo compound represented by the general formula [3]:

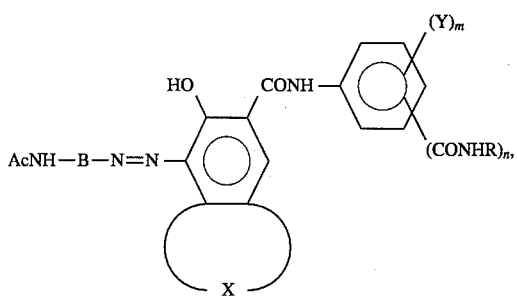

wherein X, Y, R, m and n are as defined in the general formula [1] shown above and Ac is an acyl group. By hydrolysis of the monoazo compound, an amine represented by the general formula [4] is obtained:

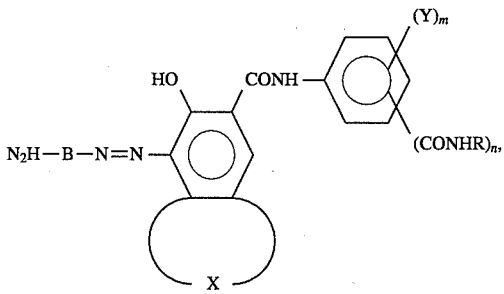

wherein X, Y, R, m and n are as defined in the general formula [1] shown above.

The amine represented by the general formula [4] is converted into a diazo compound by a conventional method and the diazonium salt thus formed is brought into coupling with another coupling component different from the first coupling component to obtain a bis-azo compound represented by the general formula [1] shown above.

An example of synthesis is described in the following. Other azo compounds represented by the general formula [1] can be synthesized according to a method similar to the following. However, the example of synthesis is not to be construed to limit the scope of the invention.

Example of synthesis [Synthesis of Compound (1) shown above]

Into 100 weight parts of water and 8 weight parts of 35 weight % concentrated hydrochloric acid, 5.9 weight parts of 4-amino-4'-acetylamino-3,3'-dichlorobiphenyl was dispersed. While the solution is kept at a temperature of 5° C. or lower, 16 weight parts of a 10 weight % aqueous solution of sodium nitrite was dropped under sufficient stirring to obtain a solution of a diazo compound.

Then, the solution of a diazo compound obtained above was dropped during the time of 15 minutes at room temperature into a solution prepared by dissolving 8.4 weight parts of N-(4-phenylcarbamoylphenyl)-3-hydroxy-2-naphthoic acid amide into 200 weight parts of a 2 weight % aqueous solution of sodium hydroxide. After finishing the dropping, the reaction solution was stirred for additional 2 hours. A monoazo compound formed was separated by filtration and washed thoroughly with water. To the product, 50 weight parts of water and 50 weight parts of a 35 weight % concentrated hydrochloric acid were added and the mixture was stirred at the refluxing temperature for 10 hours.

Hydrochloride of the amine thus formed was separated by filtration after cooling, deflocculated and dispersed in water to form a 100 ml of a dispersion. To this dispersion, 16 weight parts of a 35 weight % concentrated hydrochloric acid was added. While the mixture was kept at 5° C. or lower, 16 weight parts of a 10 weight % aqueous solution of sodium nitrite was dropped under sufficient stirring and the mixture was kept stirring for additional 60 minutes at the same temperature to obtain another solution of diazo compound.

Then, the solution of the diazo compound obtained above was dropped during the time of 15 minutes at room temperature into a solution prepared by dissolving 5.8 weight parts of naphthol AS into 300 ml of a 3 weight % methanol solution of hydrochloric acid. After finishing the dropping, the mixture was stirred for additional 2 hours. Precipitate formed was separated by filtration and washed thoroughly with water to obtain 15.1 weight parts of a crude product of Compound (1) (yield, 83 %). The crude product was washed with dimethylformamide (DMF) and acetone, successively, and dried to obtain a purified product.

Physical constitution of the photosensitive material for electronic photography of the present invention may have any of conventional forms. A carrier generating layer containing the carrier generating substance of the azo compound described above as the main component thereof and a carrier transporting layer containing a carrier transporting substance as the main component thereof may be laminated on a conductive supporting material. A photosensitive layer may be formed by dispersing a carrier generating substance in a carrier transporting substance. The layers may be laminated with an intermediate layer. Therefore, the following patterns of constitution can be formed.

1) A supporting material/a carrier generating layer/a carrier transporting layer 2) A supporting material/a carrier transporting layer/a carrier generating layer 3) A supporting material/a carrier transporting layer containing a carrier generating substance 4) A supporting material/an intermediate layer/a carrier generating layer/a carrier transporting layer 5) A supporting material/an intermediate layer/a carrier transporting layer/a carrier generating layer 6) A supporting material/an intermediate layer/a carrier transporting layer containing a carrier generating substance The intermediate layer described above is a barrier layer or an adhesive layer. A thin layer may be formed on the surface of the photosensitive material having the constitution described above to protect the surface of the material.

There are two types of the carrier transporting substance, one of which transports electrons and the other of which transports positive holes. Any of these may be used for forming the photosensitive material of the present invention.

The photosensitive material for electronic photography of the present invention can be produced by a conventional method according to the technology known in the production of photosensitive materials using organic photoconductive materials. For example, a carrier generating layer in a photosensitive layer of the two layer constitution can be produced by forming the azo compound into fine particles in a suitable medium, adding a binder according to necessity, followed by coating on a conductive supporting material directly or through an intermediate layer or by coating and drying on a carrier transporting layer which has been formed in advance. Diameter of the fine particles dispersed in the medium is 5 μm or less, preferably 3 μm or less and most preferably 1 μm or less.

Kind of the binder is not particularly limited when a binder is used. A film forming polymeric material having hydrophobic property, a high permittivity and electronic insulating property is preferable as the binder. Various kinds of thermoplastic or thermosetting synthetic resin are preferably used. As easily understood, it is convenient that the medium described above has the ability to dissolve the binder. Amount of the binder used is selected in the range of 0.1 to 5 times by weight of the amount of aforesaid carrier generating substance. Thickness of the carrier generating layer is in the range of 0.01 to 20 μm and preferably in the range of 0.05 to 5 μm.

The carrier transporting layer can be formed by dispersing or dissolving the carrier transporting substance into a suitable medium, then coating the dispersion or the solution on a conductive supporting material and drying the coated layer. It is preferred that a binder is used except when a carrier transporting substance having the function of the binder by itself, such as poly-N-vinylcarbazole, poly-N-glycidylcarbazole and the like, is used. The same kinds of binder as those used for the formation of the carrier generating layer can be used. Amount of the binder used is selected in the range of 0.2 to 5 times by weight of the amount of the carrier transporting substance. Thickness of the carrier transporting layer is in the range of 1 to 100 μm and preferably in the range of 5 to 50 μm.

For formation of the carrier generation-carrier transportation layer of the dispersion type, a carrier transporting substance is dissolved or dispersed in aforesaid dispersion for formation of the carrier generating layer and coated on a conductive supporting material. Kind of the carrier transporting substance can be selected according to desire. It is generally preferred as described above that a binder is used except when the carrier transporting substance having the function as a binder by itself is used. When the intermediate layer is formed between the supporting material and the photosensitive layer of the laminate type or the dispersion type, one kind or a mixture of two or more kinds selected from the carrier generating substance, the carrier transporting substance, the binder, additives and other generally used materials can be used for the intermediate layer within the range that the function of the intermediate layer is not adversely effected. Thickness of the intermediate layer is 10 μm or less and preferably 1 μm or less.

Conventional technologies other than those described above can be adopted to the photosensitive material for electronic photography of the present invention. For example, the photosensitive layer may contain a sensitizer. Examples of the preferable sensitizer are Lewis acids and dyestuffs forming charge transfer complexes with the organic photoconductive material. Additives, such as plasticizers, ultraviolet absorbents, antioxidants, lubricants, adhesion promoters, dispersants and the like, may be added according to necessity for the purpose of enhancing film forming property, flexibility, mechanical strength and the like of the photosensitive layer. Carrier generating substances and carrier transporting substances may be added within the range that the photosensitive property for electronic photography of the object of the present invention is not adversely effected.

For forming the carrier generating layer, the carrier transporting layer, the intermediate layer and the surface layer of the present invention, a conventional method of coating can be adopted.

The photosensitive material for electronic photography of the present invention has excellent charging property, sensitivity and image forming property as well as excellent photosensitivity, little change of the sensitivity and the charging property after repeated use, little light fatigue and excellent durability against light.

The invention will be understood more readily with reference to the following examples; however, these examples are intended to illustrate the invention and are not to be construed to limit the scope of the invention.

EXAMPLE 1

Into a ball mill, 1 weight part of Compound (1) prepared above, 1 weight part of a polyester resin (a product of Toyobo Co., Ltd.; a trade name of Vylon 200) and 50 weight parts of tetrahydrofuran were charged and dispersed well. The dispersion prepared was coated on a aluminum plate with a wire coater and dried in heated air stream of 110° C. for 30 minutes to form a carrier generating layer having a thickness of about 0.3 μm.

On the carrier generating layer thus formed, a solution prepared by dissolving 5 weight parts of p-diethylaminobenzaldehyde-N,N-diphenylhydrazone and 5 weight parts of a polycarbonate resin (a product of Teijin Kasei Co., Ltd.; a trade name of Panlite L-1250) in 70 weight parts of 1,2-dichloroethane was coated and dried in heated air stream of 80° C. for 60 minutes to form a carrier transporting layer having a thickness of 20 μm.

The photosensitive material thus prepared was left standing in an atmosphere of 55 % relative humidity (RH) to adjust moisture. Then, properties of the photosensitive material for electronic photography was evaluated using an electrostatic paper tester (a product of Kawaguchi Denki Seisakusho Co., Ltd.; a trade name of SP-428). The sample was treated with corona charge at a voltage of −5 kV with the static method and, after standing in a dark place for 10 seconds, exposed to a light source of a tungsten lamp in a condition that illuminance of the surface of the sample was 5.0 Lux. Results of the evaluation were as following:

$V_0$ (initial voltage of charging)=−830 volts $V_{D10}$ (retention of the voltage after standing for 10 seconds in a dark place)=92%

$E_{1/2}$(exposure to decrease the voltage to a half of the initial value)= 2.5 Lux·second

EXAMPLE 2

A photosensitive material was prepared and evaluated by the same method as in Example I except that Compound (2) shown above was used in place of Compound (1) in Example 1. Results are shown in the following:

$V_0$=710 volts $V_{D10}$=85%
$E_{1/2}$=2.2 Lux·second

EXAMPLE 3

Into a ball mill, 2 weight parts of Compound (3) shown above, 1 weight part of a polyester resin (a product of Toyobo Co., Ltd.; a trade name of Vylon 200) and 100 weight parts of tetrahydrofuran were charged and dispersed well. The dispersion prepared was coated on a polyester film on which aluminum layer is deposited and dried in heated air stream of 110° C. for 30 minutes to form a carrier generating layer having a thickness of about 0.5 μm. On the carrier generating layer thus formed, a solution prepared by dissolving 10 weight parts of a hydrazine compound having the formula [5] and 10 weight parts of a polycarbonate resin (a product of Teijin Kasei Co., Ltd.; a trade name of Panlite L-1250) in 100 weight parts of 1,2-dichloroethane was coated and dried in heated air stream of 80° C. for 60 minutes to form a carrier transporting layer having a thickness of 20 μm.

[5]

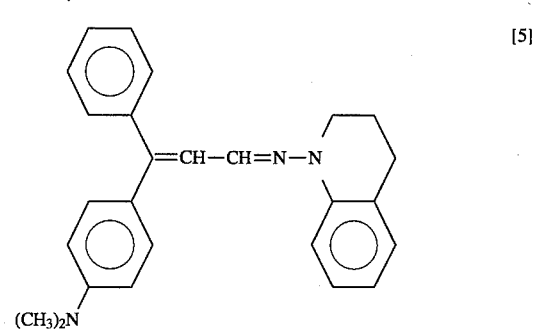

The photosensitive material thus prepared was evaluated by the same method as in Example 1 and results shown in the following were obtained.

$V_0$=−820 volts
$V_{D10}$=92%
$E_{1/2}$32 1.7 Lux·sec

EXAMPLES 4 TO 14

Photosensitive materials were prepared and evaluated by the same method as in Example 3 except that one of the compounds shown in Table 1 was used in place of Compound (3) in Example 3. Results of evaluation are also shown in Table 1.

TABLE 1

| | Compound | $V_0$ (−V) | $V_{D10}$ (%) | $E_{1/2}$ (Lux · sec) |
|---|---|---|---|---|
| Example 4 | (6) | 850 | 93 | 2.0 |
| Example 5 | (7) | 930 | 98 | 4.5 |
| Example 6 | (8) | 760 | 89 | 1.8 |
| Example 7 | (11) | 700 | 85 | 1.4 |
| Example 8 | (12) | 890 | 96 | 2.3 |
| Example 9 | (14) | 770 | 94 | 2.0 |
| Example 10 | (16) | 950 | 98 | 5.7 |
| Example 11 | (18) | 810 | 87 | 2.4 |
| Example 12 | (22) | 750 | 95 | 1.6 |
| Example 13 | (24) | 630 | 75 | 3.1 |
| Example 14 | (25) | 740 | 82 | 2.2 |

Comparative Examples 1 to 5

Photosensitive materials were prepared and evaluated by the same method as in Example 3 except that one of the azo compounds (a) to (e) shown in the following which were prepared by the same method as described above was used as the carrier generating substance in place of Compound (3) in Example 3. Results of evaluation are shown in Table 2.

TABLE 2

| | azo compound | $V_{D10}$ (%) | VR (−V) | $E_{1/2}$ (Lux · sec) |
|---|---|---|---|---|
| Comparative Example 1 | (a) | 97 | 23 | 4.2 |
| Comparative Example 2 | (b) | 90 | 6 | 3.8 |
| Comparative Example 3 | (c) | 73 | 159 | 9.1 |
| Comparative Example 4 | (d) | 87 | 2 | 1.9 |
| Comparative Example 5 | (e) | 83 | 4 | 2.2 |

(a)
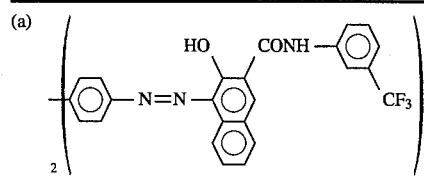

(b)
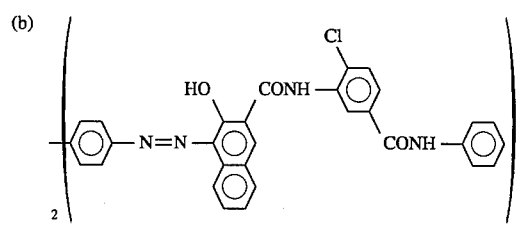

TABLE 2-continued (c) 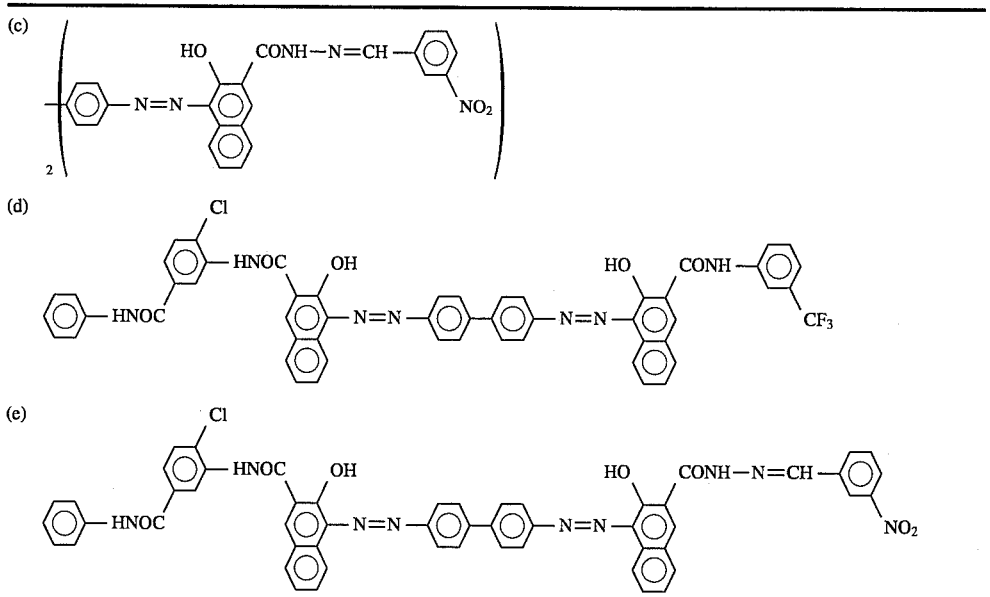

(d)

(e)

The above results clearly show that the azo compounds of the present invention which used different couplers on the both sides of the central structure are superior to conventional symmetric azo compounds.

An aluminum drum with a mirror finish was dipped into the dispersion of the carrier generating material prepared in Example 3 to coat the material on the surface of the drum. The drum was dried in hot air stream of 110° C. for 30 minutes to form a carrier generating layer having a thickness of 20 μm.

The photosensitive material thus prepared was fitted in a commercial copier. Surface voltage was adjusted to −700 V by corona discharge. After the sample was exposed to an image, development, image transfer, blade cleaning and charge elimination by light were conducted. An image having sufficient contrast, excellent clarity and excellent tone was obtained. After repeating the copying process 10000 times, no change in the image was observed.

As shown in the above, according to the present invention, a photosensitive material for electronic photography having excellent properties, such as charging property, retention of charge, sensitivity, residual voltage and image formation, and showing no change of the properties after repeated use for a long time can be obtained by using an azo compound having a specific structure as the carrier generating substance. Therefore, a photosensitive material for electronic photography of a laminate type or a dispersion type having high performance and high durability can be provided.

While the invention has been particularly shown and described with reference to preferred embodiments thereof, it will be understood by those skilled in the art that the foregoing and other changes in form and details can be made therein without departing from the spirit and scope of the invention.

What is claimed is:

1. An organic photoconductive material represented by the following general formula [1]:

$$A_1\text{-}N{=}N\text{-}B\text{-}N{=}N\text{-}A_2 \quad [1],$$

wherein B is a divalent organic group bonded to nitrogen atoms forming azo groups, $A_1$ and $A_2$ are groups different from each other, $A_1$ is represented by the following general formula [A1]:

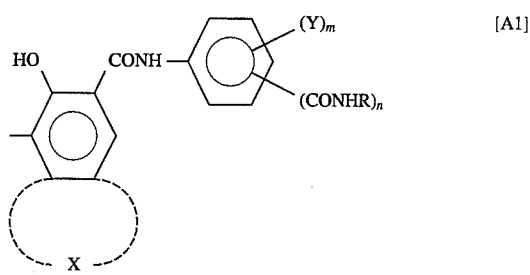

wherein X is an atomic group which is necessary for forming a substituted or unsubstituted aromatic hydrocarbon ring or a substituted or unsubstituted aromatic hetero-ring by condensation with the benzene ring, Y is an atom or a group selected from the group consisting of a hydrogen atom, an alkyl group, an alkoxy group and a halogen atom, m is an integer of 1 to 4, R is a substituted or unsubstituted aromatic hydrocarbon ring group or a substituted or unsubstituted aromatic hetero-ring group and n is 1 or 2, and $A_2$ is a group represented by the following general formulae [A2];

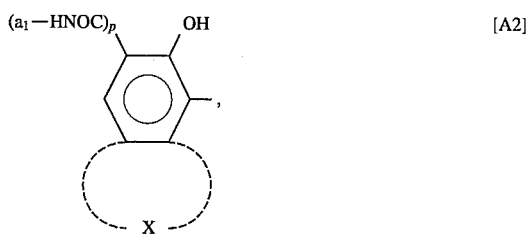

wherein $a_1$ is a group selected from R, -N=CH-R and

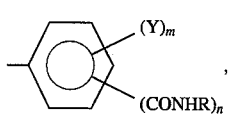

R, X, Y, m and n are the same as those in the general formula

[A1] and p is 0 or 1.

2. An organic photoconductive material as claimed in claim 1, wherein A2 in the general formula [1] is a group represented by the following general formula [A4]:

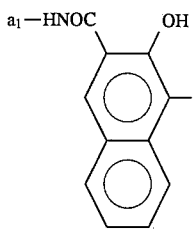
[A4]

wherein $a_1$ is the same as that in the general formula [A2] in claim 1.

3. An organic photoconductive material as claimed in claim 1, wherein B in the general formula [1] is a group represented by the following general formula [B1]:

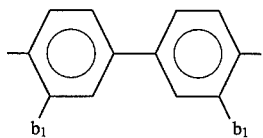
[B1]

wherein $b_1$ is H, Cl, Br, F, $CH_3$ group or $OCH_3$ group.

4. An organic photoconductive material as claimed in claim 1, wherein X in the general formula [A1] is a condensed benzene ring and the organic photoconductive material is represented by the following general formula [X1]:

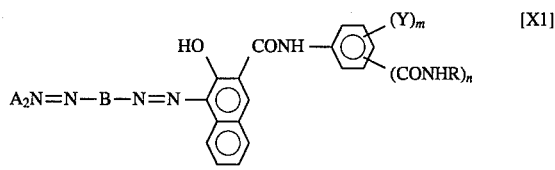
[X1]

wherein $A_2$, B, Y, R, m and n are the same as those in the general formula [A1].

5. An organic photoconductive material as claimed in claim 1, wherein R in the general formula [A1] is represented by the following general formula [R1]:

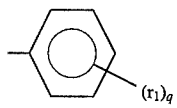
[R1]

wherein $r_1$ is one of $-CH_3$, $-C_2H_5$, F, Cl, Br, I, $-OCH_3$, $-NO_2$, $-N(CH_3)_2$ and $-CF_3$ and q is 0, 1 or 2.

6. An organic photoconductive material as claimed in claim 4, wherein, in the general formula [X1], $A_2$ is a group represented by the general formula [A4]:

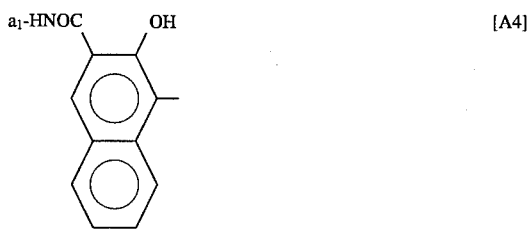
[A4]

B is a group represented by the general formula [B1]:

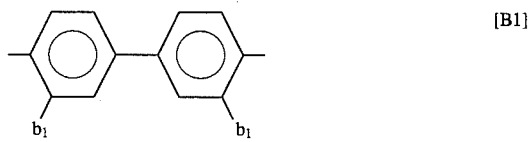
[B1]

and the organic photoconductive material is represented by the following general formula [X2]:

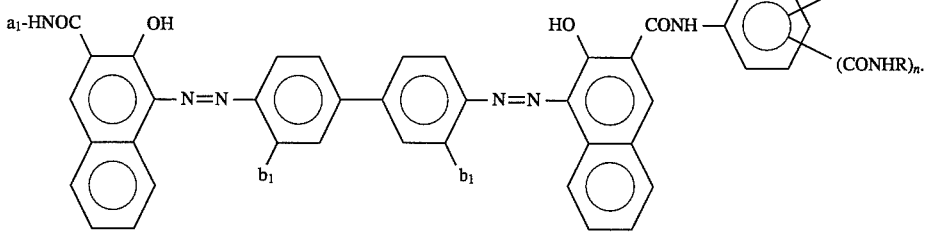
[X2]

* * * * *